Oct. 29, 1957      E. L. HOLMES      2,811,273
PROP FOR LIDS OF VEHICLE TRUNK COMPARTMENTS
Filed Nov. 10, 1955      2 Sheets-Sheet 1
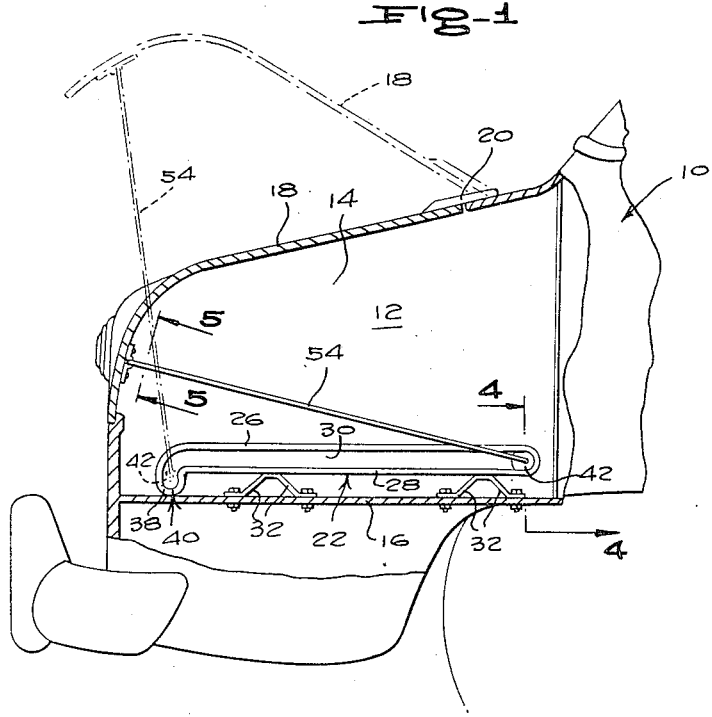
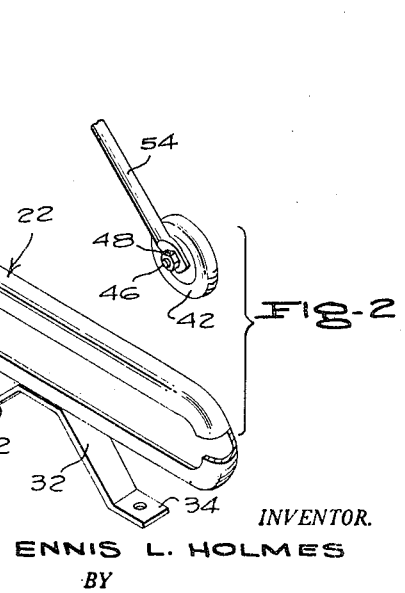
INVENTOR.
ENNIS L. HOLMES
BY
McMorrow, Berman + Davidson
ATTORNEYS.

Oct. 29, 1957 E. L. HOLMES 2,811,273
PROP FOR LIDS OF VEHICLE TRUNK COMPARTMENTS
Filed Nov. 10, 1955 2 Sheets-Sheet 2
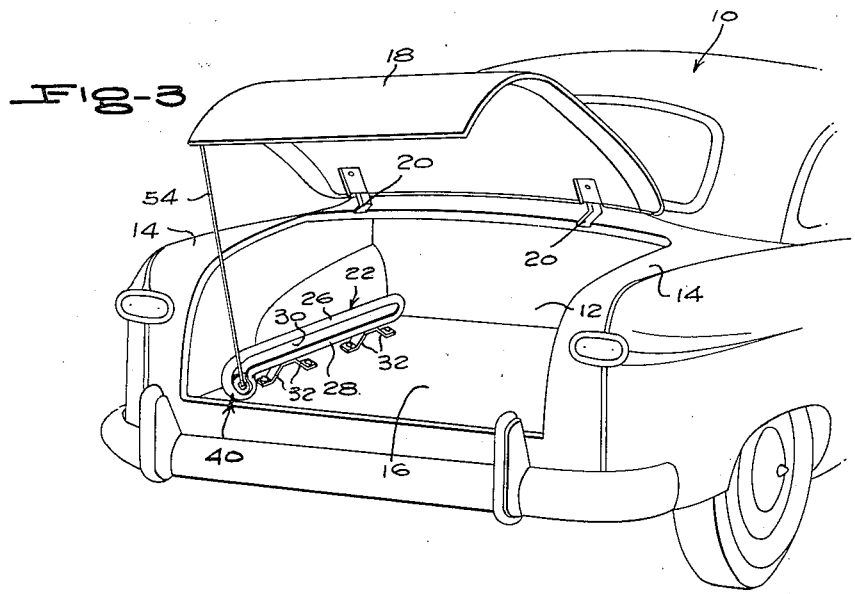
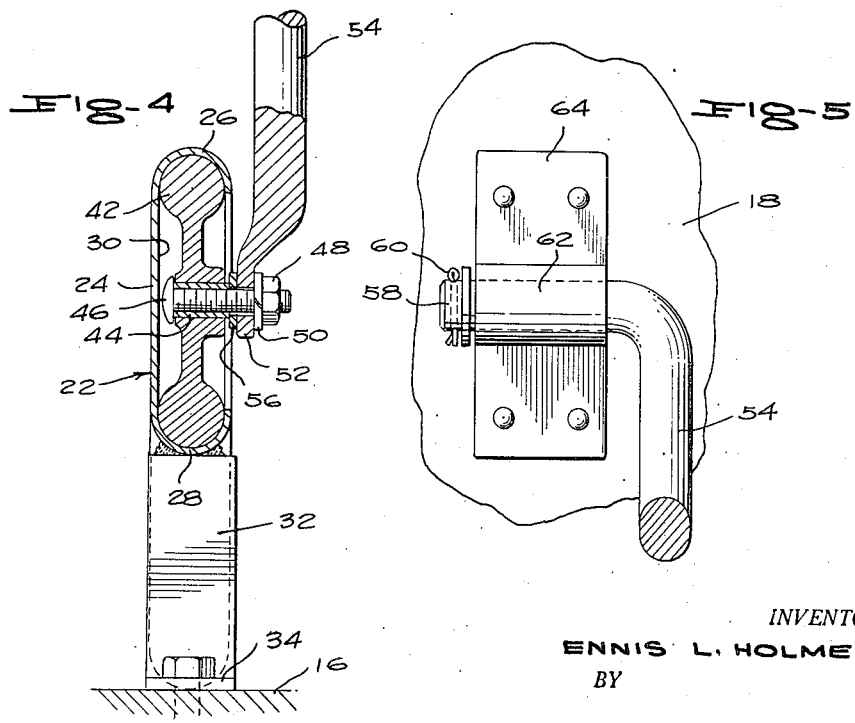
INVENTOR.
ENNIS L. HOLMES
BY
McMorrow, Berman & Davidson
ATTORNEYS United States Patent Office 2,811,273
Patented Oct. 29, 1957

2,811,273

PROP FOR LIDS OF VEHICLE TRUNK COMPARTMENTS

Ennis L. Holmes, Red Oak, Iowa

Application November 10, 1955, Serial No. 546,037

2 Claims. (Cl. 217—60)

This invention relates to an improved prop for holding open the lids of vehicle trunk compartments, and has for its primary object to provide an attachment supplementing the conventional braces provided for this purpose, which assures that the lids remain open until positive action is taken by the user to release the prop and permit the lids to be closed, and thereby prevent injury and inconvenience through the accidental closing of the lid thereof.

Other important objects and advantageous features of the invention will be apparent from the following description, and the accompanying drawings, wherein, for purposes of illustration only, a specific form of the invention is set forth in detail.

In the drawings:

Figure 1 is a fragmentary view of a vehicle showing its trunk compartment in section with the lid thereof closed and a prop in accordance with the present invention associated therewith;

Figure 2 is an enlarged contracted and fragmentary exploded perspective view of the prop;

Figure 3 is a fragmentary perspective view showing the prop in place and holding the lid open;

Figure 4 is a fragmentary enlarged sectional view taken substantially on the line 4—4 of Figure 1; and Figure 5 is an enlarged fragmentary sectional view taken substantially on the line 5—5 of Figure 1.

Referring to the drawings in detail, a vehicle designated generally 10 is provided with a trunk compartment 12 having side walls 14 and a bottom wall 16. A lid 18 is hingedly connected as at 20 to the compartment top wall 11 at the forward end of the compartment opening 13 therein, and is adapted to be swung upwardly to the open position shown in dotted lines in Figure 1, and in full lines in Figure 3, to the closed position, illustrated in Figure 1. The structure so far described is conventional and forms no part of this invention except in combination therewith.

The illustrated prop attachment 21 comprises an elongated flat tubular track 22 having an imperforate side wall 24 and a side wall 25 having a longitudinal opening 30 therein. The upper and lower longitudinal walls 26 and 28 are concavo-convex in cross section with the concave inner sides in facing relation. The side walls at their rear ends are enlarged rearwardly and downwardly to define a rounded extension 36 of segmental configuration which has around its perimeter a continuation 38 of the concavo-convex flanges 26 and 28 to define a downwardly extending holding notch 40.

Confined for rolling movement within the track 22 is a wheel 42 having an axial opening extending therethrough in which is fitted a bearing bushing 44. A bolt 46 extends through the bushing 44 and through the track opening 30 is provided with a nut 48 and a lock washer 50 for clamping to the adjacent end of the bushing and apertured ear 52 on the lower end of a prop bar 54 which extends radially outwardly from the wheel 42, as will be readily understood upon reference to Figure 4. A suitable spacer 56 encircles the bolt 46 between the bearing bushing 44 and the ear 52 of the prop bar 54 to avoid the possibility of binding the wheel 42 during its movement in the trackway 22. The wheel 42 has a hub and web structure 43 narrower than the track and has a peripheral rim 45 which is substantially as thick as the space between the side walls 24 and 25. The rim 45 has a rounded peripheral surface 47 fitting the concave inner sides of the track walls 26 and 28 and is of a diameter to roll thereagainst.

The prop bar 54 terminates at its upper or rear end in a lateral arm which extends through a sleeve 58 on a bracket plate 64 which is secured in any suitable manner to the underside of the lid 18 at the rear end of the lid. The free end of the arm 58 has thereon a cotter pin 60 securing the arm in place in the sleeve 62.

The track 22 is mounted longitudinally on the trunk compartment bottom wall 16 along a compartment side wall 14 by longitudinally spaced inverted V-shaped brackets secured to the underside of the lower concavo-convex wall 28 of the track. These brackets have divergent strap arms 32 terminating in feet 34 which bear upon the bottom wall 16 and are secured thereto, as by screws 35.

In use, it will be evident that when the lid 18 is moved to open position, as suggested by the broken lines in Figure 1, and as shown in full lines in Figure 3, the wheel 42 will move rearwardly along the track 32 until the wheel 42 drops into the stop notch 40 wherein the wheel will be retained and keep the lid open until the lid 18 is deliberately moved upwardly and the prop bar 54 pressed forwardly to move the wheel 42 forwardly along the track 22 to permit the lid to return to closed position.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A prop for the lid of a vehicle trunk compartment, comprising an elongated flat tubular track having a first side wall and a second side wall and concavo-convex upper and lower longitudinal walls between the side walls, said upper and lower walls having concave sides facing each other, said second side walls being provided with a longitudinally elongated opening, a wheel confined in said track between said side walls for movement therealong in opposite directions, said wheel having a peripheral rim substantially as thick as the space between and bearing against said side walls and a rounded peripheral surface bearing against the concave sides of the upper and lower track walls, a prop bar having a first end axially and rotatably secured to the wheel through said opening and a second end, a lid bracket pivoted on the second end of the prop bar, and means on the track for securing the track in place in the trunk compartment.

2. A prop according to claim 1 wherein said track side walls having a downward extension on one end and the concavo-convex track walls having a continuation therebetween extending around the extension defining a wheel retaining notch for the wheel.

References Cited in the file of this patent

UNITED STATES PATENTS

| 1,264,310 | Ledwinka | Apr. 30, 1918 |
| 1,395,350 | Oberst | Nov. 1, 1921 |
| 1,654,878 | Holler | Jan. 3, 1928 |
| 2,499,907 | Doeg | Mar. 7, 1950 |